Patented Aug. 9, 1938

2,126,610

UNITED STATES PATENT OFFICE 2,126,610

PRODUCTION OF HYDROXY-AROMATIC HYDROCARBONS AND HYDROXY-AROMATIC CARBOXYLIC ACIDS

Edgar C. Britton, Midland, Mich., assignor to The Dow Chemical Company, Midland, Mich., a corporation of Michigan No Drawing. Application April 29, 1933, Serial No. 668,626

15 Claims. (Cl. 260—520)

The present invention concerns a method of simultaneously preparing a hydroxy-aromatic hydrocarbon and the corresponding hydroxy ortho-carboxylic acid by reacting a halogenated aromatic hydrocarbon with aqueous alkali metal carbonate or bicarbonate.

It is known that a hydroxy-aromatic hydrocarbon can be prepared by heating a halogenated aromatic hydrocarbon under pressure with aqueous alkali metal hydroxide or carbonate. For instance, in United States Patent No. 1,882,824, it is disclosed that, when chloro-benzene is heated with $Na_2CO_3$ solution under pressure of the reacting materials to a temperature between 250° and 375° C., preferably at about 325° C., in the presence of copper as a catalyst, free phenol is formed.

I have now found that alkali metal bicarbonates may be used as well as the carbonates in the foregoing reaction, and that if the reaction mixture is heated to a temperature above 200° but not exceeding 325° C. in a closed reactor, under conditions such that metal surfaces in contact with the reacting mixture consist substantially only of copper, there is formed not only the expected hydroxy-aromatic hydrocarbon, e. g. phenol, but also a considerable quantity of the corresponding hydroxy-aromatic ortho-carboxylate, e. g. sodium salicylate.

In carrying out the reaction for the simultaneous formation of a hydroxy-aromatic hydrocarbon and the corresponding hydroxy-carboxylate, it is important that metal surfaces in contact with the reacting mixture shall consist substantially of copper alone, since other metals, particularly iron, tend to decompose the hydroxy-carboxylate product at the reaction temperature. Copper and copper compounds, e. g. the cuprous and cupric oxides, carbonates, etc., on the other hand, catalyze the formation of the hydroxy-aromatic carboxylate.

The reacted mixture separates into an oily layer containing most of the hydroxy-aromatic hydrocarbon product in free form, and an aqueous layer containing the hydroxy-carboxylic acid product dissolved as an alkali metal salt thereof. The aqueous layer can be acidified to precipitate the free hydroxy-carboxylic acid, thereby providing a direct and simple method for separating the products.

To the accomplishment of the foregoing and related ends, the invention consists in the method hereinafter fully described and particularly pointed out in the claims, the following description setting forth in detail but several of the various ways in which the principle of the invention may be employed.

In preparing phenol and salicylic acid by my method, a reaction mixture is prepared containing, preferably, about equimolecular proportions of chlorobenzene and sodium carbonate, sodium bicarbonate in amount representing from one to three moles per mole of chlorobenzene, and water in the amount required to form an at least 10 per cent solution of the carbonates, by weight. The mixture is heated with agitation in a closed copper-lined reactor to a temperature between about 200° and 325° C., preferably between about 250° and 260° C. At temperatures below 250° C., the reaction is sluggish and heating must be continued over a long period in order to complete the reaction. As the reaction temperature is raised above 260° C., the yield of salicylate becomes lower, and, if the reaction is carried out at a temperature above 325° C., the yield of salicylate is very low. When the reaction is carried out at between 250° and 260° C., the reaction is usually completed after from 4 to 7 hours of heating.

After the reaction is substantially completed, the reactor is cooled and the charge removed therefrom, which on standing divides into an aqueous layer and an oily layer. The aqueous layer is separated and steam-distilled to remove all phenol and other volatile impurities therefrom. During the steam distillation, a stream of carbon dioxide is passed into the solution in order to liberate free phenol from any sodium phenate which may be present. The steam distillation is preferably, but not necessarily, carried out under subatmospheric pressure at a temperature below 60° C., so that any sodium carbonate present may be converted into bicarbonate by the carbon dioxide. Due to the relatively low solubility of sodium bicarbonate, the latter can be crystallized nearly completely from the liquor remaining after the distillation. If the steam distillation is carried out at a temperature between about 60° and 100° C., the solution remaining after the distillation usually contains a mixture of sodium carbonate and bicarbonate, and if the distillation is carried out at a temperature above 100° C., any bicarbonate present is converted nearly completely into sodium carbonate. During the steam distillation, the volume of liquor in the still is reduced sufficiently so that sodium bicarbonate and/or carbonate may readily be crystallized on cooling.

The liquor remaining in the still after the steam distillation is cooled to crystallize sodium bicarbonate and/or carbonate therefrom and the latter are removed and re-employed in the principal reaction. The mother liquor from the crystallization is acidified with mineral acid to precipitate the salicyclic acid product. The latter is usually obtained in nearly pure form, but may be purified still further by sublimation or recrystallization.

The distillate from the aforementioned steam distillation is extracted with chlorobenzene or other water-immiscible organic solvent, e. g. benzene, toluene, carbon tetrachloride, etc., and the extract is combined with the oil layer of the original reacted mixture. The resultant mixture is fractionally distilled to recover the organic solvent and any unreacted chlorobenzene, and to obtain the diphenyl oxide and phenol products. The organic solvent, which may be chlorobenzene, is re-employed in the process as hereinbefore described, the unreacted chlorobenzene and diphenyl oxide are returned to the principal reaction wherein the chlorobenzene serves as a reactant and the diphenyl oxide suppresses further formation of said compound, and the phenol is collected as an end product from the process.

The following examples set forth several of the various ways in which the principle of the invention may be employed. It is to be understood, however, that said examples are purely illustrative and are not to be construed as a limitation on the invention.

Example 1

A mixture of 6.87 pounds of chlorobenzene, 7.5 pounds of anhydrous sodium carbonate, and 30 pounds of water was heated with agitation in a closed copper reactor to 260° C. for 6.25 hours. The bomb was then cooled and the charge removed therefrom. The aqueous layer of the mixture was separated and steam distilled, while passing a stream of carbon dioxide therethrough, to remove all phenol and diphenyl oxide therefrom. The residual liquor was cooled to crystallize sodium carbonate and bicarbonate therefrom, and filtered. The filtrate was then acidified with sulphuric acid to precipitate the salicylic acid product and the latter was separated. There was obtained 0.377 pound of nearly pure salicylic acid. The distillate from the steam distillation was extracted with chlorobenzene and the extract was combined with the oil layer of the original reacted mixture. The resultant mixture was fractionally distilled, whereby there was separated 3.71 pounds of phenol and 0.287 pound of diphenyl oxide.

Example 2

A mixture of 3.48 pounds of chlorobenzene, 5.72 pounds of anhydrous sodium bicarbonate, and 42 pounds of water was heated, with agitation, in a closed copper reactor to 280° C. for 6 hours. The reaction products were separated through procedure similar to that described in Example 1. There were obtained 1.855 pounds of phenol, 0.186 pound of salicylic acid and 0.035 pound of diphenyl oxide.

Example 3

A mixture of 293 grams of chlorobenzene, 276 grams of sodium carbonate, 262 grams of sodium bicarbonate, and 3400 grams of water was heated in a rotating copper bomb to 260° C. for 6 hours. The reaction products were separated as in Example 1. There were obtained 175 grams of phenol, 31.6 grams of salicylic acid, and only a trace of diphenyl oxide.

Example 4

A mixture of 200 grams of 4-chlorotoluene, 338 grams of sodium carbonate, and 3050 grams of water was heated in a rotating copper bomb to 300° C. for 2 hours. The procedure followed in separating the reaction products was similar to that described in Example 1. There were obtained 148 grams of paracresol, 11 grams of 3-carboxy-4-hydroxy-toluene of melting point 149–150° C., and 8 grams of 4.4'-dimethyl-diphenyl oxide.

Any halogenated aromatic hydrocarbon having at least one position ortho to the halogen substituent free, e. g. bromobenzene, ortho-chlorotoluene, chloro-diphenyl, alpha-bromonaphthalene, beta-chloronaphthalene, 2-chloro-ethyl-benzene, etc., may be reacted with aqueous alkali metal carbonate or bicarbonate according to my method to produce simultaneously the corresponding hydroxy-aromatic compound and hydroxy-carboxylic acid. Although the examples have shown only the use of sodium carbonate and/or bicarbonate in the reaction the corresponding potassium or other alkali metal compounds may equally well be employed. The optimum temperature at which the reaction should be carried out is, of course, dependent somewhat upon the particular reactants employed, but in any instance, the reaction temperature should be below that at which the hydroxy-carboxylate product is decomposed.

Instead of carrying the reaction out in a copper-lined reactor, as hereinbefore specified, it may be carried out in a reactor lined with enamel, glass, or other relatively inert material, employing a copper-containing catalyst such as metallic copper, a cuprous or cupric oxide, carbonate, etc.

Again, although I have set forth preferred procedure to be followed in separating carbonate and/or bicarbonate from the reacted mixture, such separation may be effected through other procedure. For instance, the steam distillation of the aqueous layer of the reacted mixture may be carried out at a relatively high temperature so as to convert bicarbonate present into the more soluble carbonate and during said distillation the volume of liquor in the still may be reduced sufficiently to crystallize the sodium chloride contained therein. The still liquor may then be filtered while hot, the filtrate may be diluted slightly and substantially pure sodium carbonate may be crystallized on cooling.

Instead of removing the hydroxy-aromatic hydrocarbon and diaryl oxide from the aqueous layer of a reacted mixture by means of a steam distillation, such compounds can be removed by extracting with a water-immiscible organic solvent such as benzene, chlorobenzene, etc.

The generic expression "an alkali metal carbonate" where employed in the claims, refers to any compound selected from the class consisting of alkali metal carbonates and bicarbonates. Similarly, the expression "a sodium carbonate" refers to a compound selected from the class consisting of sodium carbonate and bicarbonate.

I therefore particularly point out and distinctly claim as my invention:—

1. In a method of making a hydroxy-aromatic hydrocarbon and the corresponding hydroxy ortho-carboxylic acid, the steps which consist in heating a nuclear halogenated aromatic hydrocarbon with an aqueous solution of an alkali metal carbonate at superatmospheric pressure to a reaction temperature between about 200° and about 325° C. in the presence of a copper-containing catalyst but in the substantial absence of metals other than copper, separating the hydroxy-aromatic hydrocarbon product from the reacted mixture, acidifying the residual aqueous mixture to liberate the hydroxy-aromatic carboxylic acid from its alkali metal salt, and thereafter separating said acid product.

2. In a method of making a hydroxy-aromatic hydrocarbon and the corresponding hydroxy ortho-carboxylic acid, the steps which consist in heating a nuclear halogenated aromatic hydrocarbon with an aqueous solution of an alkali metal carbonate at superatmospheric pressure to a reaction temperature between about 250° and 325° C. in the presence of a copper-containing catalyst but in the substantial absence of metals other than copper, separating the hydroxy-aromatic hydrocarbon product from the reacted mixture, acidifying the residual aqueous mixture to liberate the hydroxy-aromatic carboxylic acid from its alkali metal salt, and thereafter separating said acid product.

3. In a method of simultaneously preparing a hydroxy-aromatic hydrocarbon and the corresponding hydroxy ortho-carboxylic acid, the steps which consist in heating a nuclear halogenated aromatic hydrocarbon with an aqueous solution of a sodium carbonate at superatmospheric pressure, to a reaction temperature between about 250° and about 260° C., in the presence of metal surfaces consisting substantially of copper and in the substantial absence of metals other than copper, thereafter separating the aqueous and oily layers of the reacted mixture, fractionally distilling the oily layer to separate the hydroxy-aromatic hydrocarbon product, acidifying the aqueous layer to precipitate the hydroxy ortho-carboxylic acid and separating the latter.

4. In a method of making phenol and salicylic acid, the steps which consist in heating a mono-halo-benzene with an aqueous solution of an alkali metal carbonate at superatmospheric pressure to a reaction temperature between about 200° and about 325° C. in the presence of a copper-containing catalyst but in the substantial absence of metals other than copper, separating phenol from the reacted mixture, acidifying the residual aqueous mixture to liberate salicylic acid from its alkali metal salt, and thereafter separating the salicylic acid product.

5. In a method of making phenol and salicylic acid, the steps which consist in heating chlorobenzene with an aqueous solution of an alkali metal carbonate at superatmospheric pressure to a reaction temperature between about 250° and about 325° C. in the presence of a copper-containing catalyst but in the substantial absence of metals other than copper, separating phenol from the reacted mixture, acidifying the residual aqueous mixture to liberate salicylic acid from its alkali metal salt, and thereafter separating the salicylic acid product.

6. In a method of simultaneously preparing phenol and salicylic acid, the steps which consist in heating chlorobenzene with an aqueous solution of a sodium carbonate at superatmospheric pressure to a reaction temperature between about 250° and about 260° C. in the presence of metal surfaces consisting substantially of copper, thereafter separating the aqueous and oily layers of the reacted mixture, steam distilling the aqueous layer, while passing carbon dioxide thereinto, to remove phenol and other volatile organic compounds from the still liquor, crystallizing and removing a sodium carbonate from the liquor remaining after said steam distillation, acidifying the mother liquor to precipitate salicylic acid, and removing the latter, extracting the distillate from the steam distillation with a water-immiscible organic solvent, combining the extract with the oily layer of the reaction mixture, fractionally distilling the resultant mixture to separate the phenol product, unreacted chlorobenzene, and diphenyl oxide, and returning the sodium carbonate, unreacted chlorobenzene, and diphenyl oxide to the principal reaction.

7. In a method wherein phenol and alkali metal salicylate are formed by heating a monohalobenzene with an aqueous solution of an alkali metal carbonate, the steps which consist in separating the aqueous and oily layers of the reacted mixture, steam distilling phenol and other volatile organic compounds from the aqueous layer while passing carbon dioxide into the latter, crystallizing and separating an alkali metal carbonate from the aqueous liquor remaining after said steam distillation, acidifying the mother liquor to liberate the salicylic acid from its alkali metal salt, and thereafter separating the salicylic acid product.

8. In a method of making a hydroxy-aromatic hydrocarbon and the corresponding hydroxy ortho-carboxylic acid, the steps which consist in preparing a mixture containing a nuclear halogenated aromatic hydrocarbon and a normal alkali metal carbonate in approximately equimolecular proportions, an alkali metal bicarbonate in amount representing from 1 to 3 mols per mol of the halogenated aromatic hydrocarbon, and water in amount required to form an at least 10 per cent by weight solution of the carbonates, heating said mixture at superatmospheric pressure to a temperature between about 200° and 325° C. in the presence of a copper-containing catalyst but in the substantial absence of metals other than copper, separating the hydroxy-aromatic hydrocarbon product from the reacted mixture, acidifying the residual aqueous mixture to liberate the hydroxy-aromatic carboxylic acid, and separating the latter.

9. In a method of making phenol and salicylic acid, the steps which consist in preparing a mixture containing a monohalo-benzene and a normal alkali metal carbonate in approximately equimolecular proportions, an alkali metal bicarbonate in amount representing from 1 to 3 mols per mol of the monohalo-benzene, and water in amount sufficient to form an at least 10 per cent by weight solution of the carbonates, heating the mixture at superatmospheric pressure to a temperature between about 250° and about 260° C. in the presence of a copper-containing catalyst but in the substantial absence of metals other than copper, separating phenol from the reacted mixture, acidifying the residual aqueous mixture to liberate salicylic acid, and separating the latter.

10. The method of simultaneously producing aromatic hydroxy-carboxylic acids and phenols from aromatic hydrocarbon halides of the type halogenated in the ring, comprising heating said halide with the bicarbonate of a metal to temperatures between 200° and 325° C. under superatmospheric pressure and in the presence of water, said bicarbonate providing the carbon dioxide necessary for the formation of said acid, and separating the phenol and the hydroxy-carboxylic acid from the product of reaction.

11. The method of simultaneously producing aromatic hydroxy-carboxylic acids and phenols from aromatic hydrocarbon halides of the type halogenated in the ring, comprising heating said halide with the bicarbonate of a metal whose oxide has an alkaline reaction to temperatures between 200° and 325° C. under superatmospheric pressure and in the presence of water and copper, said bicarbonate yielding the carbon dioxide, necessary for the formation of said acid, and separating the phenol and the hydroxy-carboxylic acid from the product of reaction.

12. The method of simultaneously producing aromatic hydroxy-carboxylic acids and phenols from aromatic hydrocarbon halides of the type halogenated in the ring, comprising heating said halide with a bicarbonate of a metal whose oxide has an alkaline reaction to temperatures between 200° and 325° C. under superatmospheric pressure and in the presence of water, said bicarbonate yielding during the reaction the carbon dioxide necessary for the formation of said acid, extracting the phenol from the product of reaction by a solvent, and precipitating the hydroxy-carboxylic acids by acidulation of the residue.

13. The method of simultaneously producing aromatic hydroxy-carboxylic acids and phenols from aromatic hydrocarbon halides of the type halogenated in the ring, comprising heating said halide with a carbonate of a metal whose oxide has an alkaline reaction to temperatures between 200° and 325° C. under superatmospheric pressure and in the presence of water, such carbonate yielding during the reaction the carbon dioxide necessary for the formation of said acid, removing the phenol from the product of the reaction and precipitating the hydroxy-carboxylic acid from the residual alkaline liquor by acidulation.

14. The method of simultaneously producing aromatic hydroxy-carboxylic acids and phenols from aromatic hydrocarbon halides of the type halogenated in the ring, comprising heating said halide with a carbonate of a metal whose oxide has an alkaline reaction to temperatures between 200° and 325° C. under superatmospheric pressure and in the presence of water, such carbonate yielding during the reaction the carbon dioxide necessary for the formation of said acid, removing the phenol from the product of the reaction, concentrating the remaining alkaline solution and precipitating the hydroxy-carboxylic acid from the remaining liquor by acidulation.

15. The method of simultaneously producing aromatic hydroxy-carboxylic acids and phenols from aromatic hydrocarbon halides of the type halogenated in the ring, comprising heating said halide with an alkali-metal carbonate to temperatures between 200° and 325° C. under superatmospheric pressure and in the presence of water, such carbonate yielding during the reaction the carbon dioxide necessary for the formation of said acid, removing the phenol from the product of the reaction, concentrating the remaining alkaline solution, and precipitating the hydroxy-carboxylic acid from the remaining liquor by acidulation.

EDGAR C. BRITTON.